United States Patent
Jung et al.

[11] Patent Number: 6,155,074
[45] Date of Patent: Dec. 5, 2000

[54] SPECIAL AIR HANDLING SYSTEM FOR BIVALENT AIR-CONDITIONING OF A ROOM

[75] Inventors: Heinz-W. Jung, Butzbach; Helmut Buss; Manfred Stellamans, both of Rhauderfehn, all of Germany

[73] Assignee: Hansa Ventilatoren-und Maschinenbau Neumann GmbH & Co. KG, Germany

[21] Appl. No.: 09/267,940

[22] Filed: Mar. 11, 1999

[30] Foreign Application Priority Data

Mar. 19, 1998 [DE] Germany ........................ 198 13 157

[51] Int. Cl.⁷ .................................................. F25B 39/04
[52] U.S. Cl. ................ 62/506; 62/507; 62/498; 62/428; 62/412
[58] Field of Search ............... 62/506, 507, 428, 62/498, 412, 407

[56] References Cited

U.S. PATENT DOCUMENTS

| 4,464,907 | 8/1984 | Mack et al. ............... 62/489 X |
| 5,636,528 | 6/1997 | Sasaki ........................ 62/507 |
| 5,689,962 | 11/1997 | Rafalovich ............... 62/506 X |
| 5,896,753 | 4/1999 | Kwak et al. ............... 62/498 X |

FOREIGN PATENT DOCUMENTS

| 3318975 | 1/1984 | Germany .......................... F24J 3/04 |
| 3719392 | 12/1988 | Germany . |
| 4108890 | 9/1992 | Germany . |
| 4305720 | 9/1994 | Germany . |
| WO9414011 | 6/1994 | WIPO . |

*Primary Examiner*—William Doerrler
*Assistant Examiner*—Chen-Wen Jiang
*Attorney, Agent, or Firm*—Christie, Parker & Hale, LLP

[57] ABSTRACT

Special air handling system for bivalent air-conditioning of a room or building with an airstream system (Primary Air System) that exhibits an Exhaust Airstream directed towards the environment of the room and a Supply Airstream directed into the room that consists of or composes of the return air from the room and/or the outside air and with a Convective and/or Radiation System (Secondary Air-Conditioning System) with a Convective and/or Radiation Unit and a Heat Exchanger Unit located inside the room or building to be air-conditioned, through which a carrier medium flows. The Heat Exchanger Unit or an Evaporator/Condenser System that is connected with the Heat Exchanger Unit via Pipes containing refrigerant is located inside the Exhaust Airstream of the Primary Air System.

25 Claims, 4 Drawing Sheets

SPECIAL AIR HANDLING SYSTEM FOR BIVALENT AIR-CONDITIONING OF A ROOM

BACKGROUND OF THE INVENTION

The invention refers to a special air handling system for bivalent air-conditioning of a room.

Air handling systems for the air-conditioning of rooms are classified as systems with and without a ventilation function. Systems with a ventilation function comprise systems for outside air conveyance and introduction into the room to be air-conditioned; whereas systems without a ventilation function, such as circulating-air handling systems, do not comprise outside air conveyance and introduction, and operate in pure circulating-air principle. Both types of air handling systems include the application of four thermodynamic air handling functions, namely: heating, cooling, humidification and dehumidification. To these four thermodynamic air handling functions, single stage or multistage air filtering with different filter classification standards can be added.

Partial air-conditioning systems, according to the definition, have a lower number of thermodynamic air handling functions. For instance, by a ventilation system, one understands an air handling system with a ventilation function and with or without a thermodynamic air handling function; by a circulating-air system, one understands an air handling system without a ventilation function and without or with only one thermodynamic air handling function; by a partial air-conditioning system, one understands an air handling system with a ventilation function and two or three thermodynamic air handling functions; and by a partial circulating-air air-conditioning system one understands an air handling system without a ventilation function, but with two or three thermodynamic air handling functions.

To fulfill air handling functions, air-conditioning units normally find application in modular design or the so-called cabinet-type air-conditioning units. These pieces of equipment comprise thermally or acoustically insulated casing. Besides the fans for air conveyance, the casing also accommodates other component parts for air handling—such as filters for cleaning the air. They also incorporate units necessary for thermodynamic air handling, such as coolers for cooling ventilation air and generating condensate for air dehumidification, as well as air heaters and humidifiers.

cooling systems characterized by diverse process applications especially are used in room cooling. Hence, there are air-conditioners provided with a cold water cooler that is constantly fed from an externally installed cold water generator (cold water chiller) for cooling and dehumidification purposes. In this system, two component parts are necessary, namely, on the one hand, the air handling system with air cooler, and on the other hand, the cold water generator with refrigeration machines and condensers for expelling heat energy from the cooling process. In the case of this air-conditioner, the unusable heat energy incurred from the cooling process is usually expelled by means of condenser fans.

In contrast to air-conditioners with a cold water cooler and an externally installed cold water generator by which the cooling energy is transferred to the cold water by means of heat exchangers, direct evaporation systems operate without this find of conversion. In the case of these direct evaporation systems, the refrigerant is directly evaporated inside the piping system of the evaporator (air cooler), and thus the cooling energy transferred to the airstreams is moved or conveyed by means of fans into an air-conditioner.

Even this system needs a condenser for expelling the heat energy incurred from the cooling process. These systems are usually installed externally and also incorporate condensers besides refrigeration compressors.

Furthermore, bivalent air-conditioning systems that both handle the so-called primary air, by which, as a rule, the outside air is meant, are known. With the so-conditioned and cooled primary air, only one part of the room's or building's cooling load is expelled. To complement this primary air system, convector or radiant systems are arranged within the room or building, catering for further and additional cooling directly at the heat source, thus, directly inside the rooms with air-conditioning or cooling requirement.

The above-described systems additionally can be fitted with heat reclaim component parts for energy saving, so that systems with different efficiencies can be provided. This form of heat reclaim, nonetheless, makes use of energy quantities contained in the airstreams—outside air, circulating/supply air and return/exhaust air, which are conveyed by the supply and return air fans. In the process, the supply and exhaust airstreams are held somewhat equal. Or the air-conditioner, depending upon the functional requirement, is designed to slightly operate in an excess or low-pressure mode. In principle, what applies here is that the supply air brought into the rooms to be air-conditioned must again be expelled as return air from the rooms.

The role of the invention on hand is to improve the efficiency of an air handling system for bivalent air-conditioning of a room.

SUMMARY OF THE INVENTION

The inventive solution ensures a maximum efficiency of an air handling system for bivalent air-conditioning of a room in which a primary airstream as well as convection and/or radiant systems are used for air-conditioning. In this process, the energy quantities provided by the convection and/or radiant systems are used for effective design and improvement of the efficiency of the air handling system.

Thus, in the inventive solution it is principally assumed that especially when cooling the air-conditioned room by means of a bivalent air-conditioning system, the primary air ratio used to transport the cooling capacity is substantially reduced and as such cannot transport the cooling load of the room or building to be air-conditioned. For this reason, additional convection or radiant systems are used. These directly provide the additional cooling capacity and hence cool the air within the air-conditioned building or rooms.

Altogether, the desired room climate is attained by applying either of the cooling functions. If one ignores systems exhibiting high internal loads due to heat sources the room climate lies well below the outside temperatures. Independent of this exception, air temperatures of the air transported to the exhaust air via the return air systems lie very low, and as expected, substantially below the outside temperatures, because cooling is preferentially used in summer.

If under this condition a condenser is located in the return/exhaust airstream, then the condenser can attain a high power factor that lies much higher than in the case of a condenser installed in warm outside air environment and operated under a higher temperature ratio. Condensation capacity is very high when the condensation surface area or condensation package is designed with maximum values, so that the power value substantially exceeds the value required for the expulsion of heat energy from the evaporation process on the supply air side.

A rather too high condenser capacity nonetheless leads to low-pressure errors in the refrigeration system if no regulating intervention is undertaken. This means that if the condenser is over-dimensioned, which happens when the available spatial conditions are exploited in the return/exhaust airstream or rather in the case of optimized design of the air-side pressure losses, the air capacity of the return/exhaust air fan must be reduced. This would lead to an increase in pressure inside the room to be air-conditioned, so that to maintain equal pressure levels inside the room to be air-conditioned, the supply air quantity fed into the room must again be expelled. Therefore, one cannot make use of the regulating possibility by reducing the air capacity of the exhaust air fan.

For this reason, the condenser must be made smaller in size and the power characteristic of the evaporator dimensioned accordingly. From this, it follows that the cool return/exhaust airstream is energetically not exploited fully but expelled unused into the environment. Therefore, in many cases the energy potential of the return/exhaust air is not exhausted to its full extent.

On the other hand, the inventive solution ensures that unused energy is used for higher, more economical condensation capacities. By integrating several cooling component parts and systems inside the air-conditioner, the efficiency of the whole air handling system is substantially increased and optimized.

In analog, the air handling system can also be used for optimizing room heating, by connecting the air handling system as heat pump and using it both for primary air heating and, for instance, domestic water heating in the form of a secondary air-conditioning system.

An advantageous arrangement of the inventive solution is characterized by the fact that the heat exchanging unit consists of a water heat exchanger connected with the convection and/or radiation unit via a supply piping and a return piping. Preferably, the heat exchanger unit consists of a refrigerant/water heat exchanger that is connected with a compressor via a refrigerant piping and a condenser arranged in the exhaust airstream and provided with a convection and/or radiation unit connected via a supply and return piping.

By combining more cooling component parts and systems inside an air-conditioner, the energy potential from the return/exhaust air can be used for higher, more economical condensation capacities, so that further operation optimization and improvement of the efficiency of the air handling system are possible.

By locating the heat exchanger unit in the exhaust airstream of the air-conditioner, an especially compact arrangement of the air handling system with a high efficiency is created.

An advantageous arrangement of the inventive solution is characterized by a twin-circuit condenser with the first circuit consisting of a first refrigerant piping that connects the condenser with a first compressor, and a second refrigerant piping that connects the compressor with an evaporator located in the supply airstream, and a third refrigerant piping that connects the evaporator with the condenser, and a second circuit with a fourth refrigerant piping that connects the condenser with a second compressor, a fifth refrigerant piping that connects the second compressor with the heat exchanger unit and a sixth refrigerant piping that connects the heat exchanger unit with the condenser.

With the arrangement of the condenser as a twin-circuit unit, the systems formed by both refrigeration systems act on a separate piping system within the heat exchanger package of the condenser. Nonetheless, both refrigerant compressors could also act on a single-circuit condenser that, in the case of a refrigerating operation, would solely lead to additional components. This however, is not important for exploiting the energy potential.

Besides a single or twin-circuit, multiple circuits are also possible, especially for a step-by-step capacity control. Such multiple circuits serve in the first place for capacity control, but also support the energetic exploitation.

An advantageous arrangement of the inventive solution is characterized by the fact that the heat exchanger unit is located in the exhaust airstream and/or in the supply airstream both for primary air treatment and for secondary air-conditioning. In the process, both the primary air system and the secondary air-conditioning system can be implemented as cold water systems so that the primary air treatment can be thermodynamically handled with cold water by means of a refrigerant-water radiator in addition to a cold water cooler, too, and not only by means of direct evaporation.

As an alternative to this method, the circuits of the primary air system and the secondary air-conditioning system can be operated by means of direct evaporation.

Another advantageous arrangement of the inventive solution is characterized by the fact that the heat exchanger unit consists of a tubular evaporator or a plate heat exchanger. These units facilitate the use of excess condenser capacity for cold water generation in an optimum manner. The otherwise usual, separately installed component part for cold water generation can therefore be disposed of, without substitution, so that a very compact design is realized, which substantially reduces investment costs and represents an economical operation even in view of energy, because the available reserves in the return/exhaust air are used in an optimum manner.

Only the condenser should be compulsorily located inside the return/exhaust airstream. The compressor and the refrigerant/water heat exchanger can also be located outside the air-conditioner. With this, only the compact design would have to be abandoned, functionally this would, however, have no influence on the operation of the air-conditioner.

An advantageous arrangement of the inventive solution is characterized by the fact that the condenser and evaporator are executed as register and can be switched over functionally.

The special air handling system can be operated as heat pump during the seasons in which cooling is not necessary, whereby according to an advantageous arrangement of the inventive solution, the condenser and evaporator are executed as register and may be switched over functionally, so that the evaporator becomes the condenser and the condenser becomes the evaporator. In this manner, energy can be derived from the exhaust airstream in order to feed the energy into the supply airstream, so that the special air handling system worts as a heat pump circuit.

Furthermore, it is possible that such a heat pump circuit may be switched over for the purpose of domestic water heating. In the process, the register located in the return/exhaust airstream would operate as an evaporator and the energy derived from the return/exhaust airstream would be used for domestic water heating via a refrigerant-water heat exchanger.

Another advantageous arrangement of the inventive solution is characterized by at least two separate ducts for the exhaust airstream and the supply airstream incorporating an air-conditioner that exhibits an independently controlled damper system with an outside air connection and a return air connection on its inlet side for the airstreams, for arbitrary combination of the exhaust and supply air connections on its outlet side for airstreams, as well as an exhaust air fan and a supply air fan, whereby the damper system is located on the suction side of the fans.

By the arrangement of independently controlled damper systems on the suction side of the air-conditioner, which facilitates an arbitrary mixing ratio of the supply and exhaust airstreams from the outside and return airstreams in order to satisfy the conditioning demand for the supply and the exhaust air side, high economic viability and maximum safety are ensured. As regards the condenser capacity, the independently controlled damper systems offer the advantage that even in the event of extraordinary temperature conditions that can by chance exceed the normal case, the return/exhaust airstream can be mixed with the outside air, thus always ensuring maximum operating safety.

This inventive arrangement of the air-conditioner, based on further development of the inventive solution by means of a continuously variable speed or via air conveyance capacity of the fans, makes it possible to change the speed of the exhaust air fan and thus its capacity so that even larger volume flows (for example 150%) can be transported. Damper systems ensure that the nominal value of return air is exactly accomplished and the air-based extra capacity is drawn in from the outside and not from the return air and then entirely expelled via the exhaust air fan.

The evaporator/condenser system as well as the heat exchanger unit can be selectively located on the pressure side of the fans, or some individual components of the air-conditioner can be located on the suction and pressure sides of the fans. The suction-side arrangement of the dampers is of importance to the energetic exploitation of the outside and return air for fulfilling the conditioning tasks of the air-conditioning unit.

Another advantageous arrangement of the inventive solution is characterized by the fact that a heat reclaim system, preferably executed as circuit composite system, is located in the exhaust air and supply stream duct.

Moreover, a heater for air heating, especially a warm water heater, can be located in the supply stream.

By setting the portion of the airstream system and the convective and/or radiant system for the air-conditioning of a room, the economic viability and efficiency of the special air handling system can be optimally adjusted by adjustment made to suit the ambient and air-conditioning requirements.

Additionally, by separately activating the air treatment components, the operation of the special air handling system can be optimized.

Another advantageous arrangement of the inventive solution is characterized by the fact that the air-conditioner is designed on modular basis with damper systems, air treatment components, control and switching devices and fans contained inside the individual modules.

Owing to the modular design of the air-conditioner, arbitrary combination of the air treatment units is possible. The air-conditioner can thus be adapted to the respective conditions with minimum costs. Furthermore, individual modules can be removed for maintenance purpose or replacement and be exchanged with corresponding spare modules without a long operation interruption being necessary.

Depending on choice, the air-conditioner can be assembled with separately arranged modules. Separate arrangement of the individual modules of an air-conditioner facilitates individual consideration of local spatial conditions. Thus, for instance, it is possible to install the supply and return air modules separately from one another.

In a preferable arrangement, the supply airstream is located beneath the exhaust airstream when the airstreams are arranged on top of one another.

Besides this preferable arrangement, other arrangements of the streams are also possible and can be implemented. Hence, the exhaust airstream can also lie either beneath or next to the supply airstream. It can only be binding to arrange the supply airstream beneath the exhaust airstream in the case of a vertically installed heat piping. In case of other heat reclaim systems, however, another arrangement of the supply and exhaust airstreams can prove to be more favorable.

DESCRIPTION OF THE DRAWINGS

With the help of implementation examples depicted in the drawing, the idea implicated in the invention should be explained in detail. The following show.

DETAILED DESCRIPTION OF THE INVENTION

Figure 1:
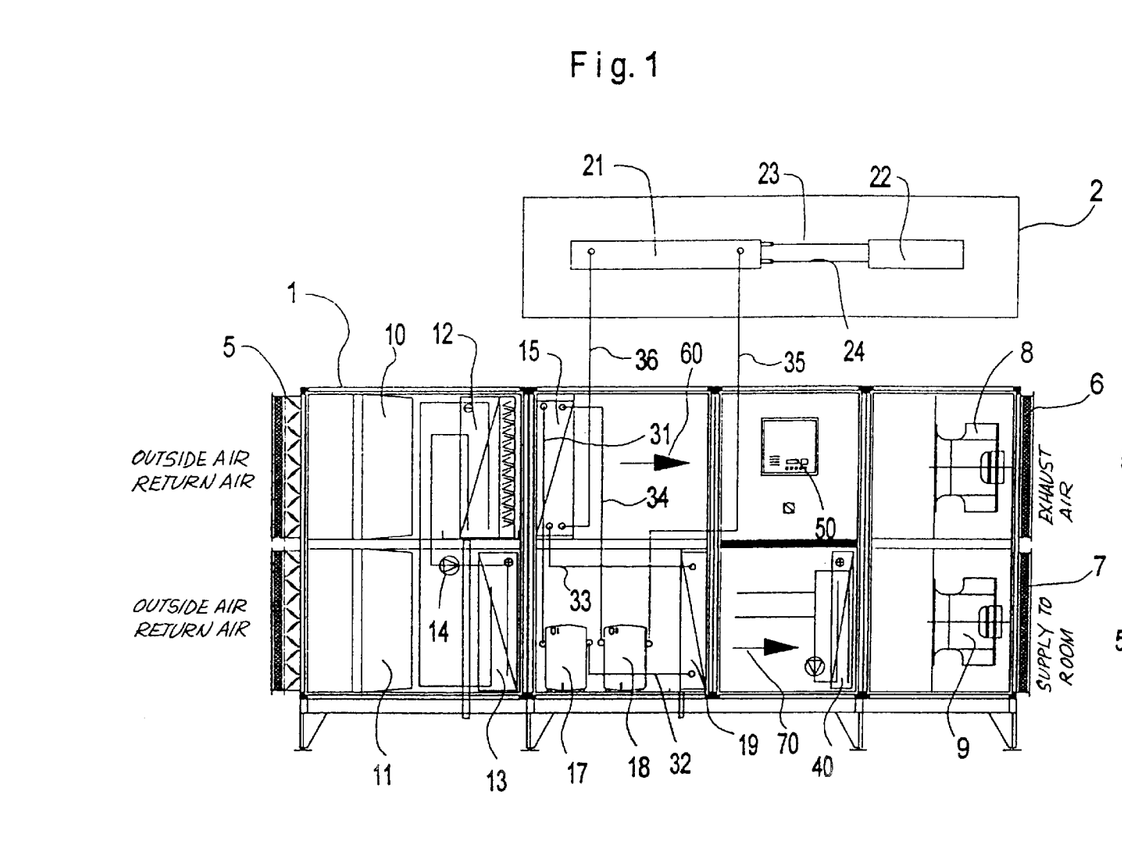
FIG. 1—Special air handling system with a longitudinal, sectional view of an air-conditioner and a principle illustration of a convective and/or radiant system.

FIG. 1 shows a principle illustration of a special air handling system for bivalent air-conditioning of a room or building with an Air-conditioner 1 as primary air system of the special air handling system and a convective and/or Radiation System 2 as secondary air-conditioning system. The Air-conditioner 1 is connected with an Outside Air Connection 3 and an Exhaust Air Connection 4 according to FIG. 2, connected to the room or building to be air-conditioned, on its air inlet side and exhibits a Damper System 5 for separating and setting the airstreams in the chambers located on top of one another, of which the position of the Dampers 51, 53 determine the outside air ratio and the position of the Dampers 52, 54 determine the return air ratio of both airstreams routed in the top or bottom chambers respectively.

The Exhaust Airstream 60 routed in the top chamber is generated by an Exhaust Air Fan 8 and expelled to the environment via the Exhaust Air Connection 6 of the Air-conditioner 1 as exhaust air. The Supply Airstream 70 routed in the bottom chamber is generated by a Supply Air Fan 9 and fed to the room or building to be air-conditioned via the Supply Air Connection 7 of the Air-conditioner 1.

Several components for air treatment are located on the suction side of the Fans 8, 9, namely Filters 10, 11, a Condenser 15 and an Evaporator 19 for cooling the supply air with the Compressors 17, 18, Heat Reclaim Systems 12, 13, 14—made as circuit-connected systems, and a Warm Water Heater for Air-heating 40. Additionally, a Switch Panel 50 is intended for installation in one of the modules, in this case in the stream of the Exhaust Air 60.

Figure 2:
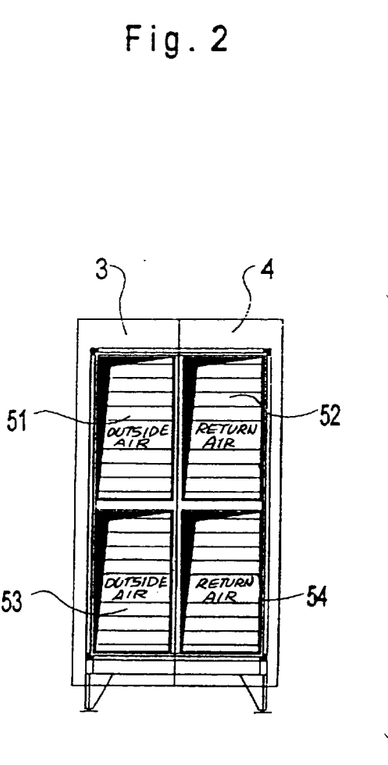
FIG. 2—A view of the suction damper system of the air-conditioner according to FIG. 1.

The chambers for the Exhaust Airstream 60 as well as those of the Supply Airstream 70 located on top of one another as depicted in FIGS. 1 and 2 can alternatively also be located besides one another. Modules of the Air-conditioner 1 can be combined in a desired manner according to the local conditions of a respective project.

The Condenser 15 is executed as a twin-circuit condenser aid connected with the first Compressor 17 via a first Refrigerant Pipe 31. The first compressor 17 is connected with the Evaporator 19 via a second Refrigerant Pipe 32 and the Evaporator 19 again connected via a third Refrigerant Pipe 33 with the first circuit of the twin-circuit Condenser 15.

The second circuit of the twin-circuit Condenser 15 is connected via a fourth Refrigerant Pipe 34 with the second Compressor 18. The second Compressor 18 is connected via a fifth Refrigerant Pipe 35 with a Heat Exchanger Unit 21. The Heat Exchanger Unit 21 is connected via a sixth Refrigerant Pipe 36 with the second circuit of the twin-circuit Condenser 15, so that this second circuit is also closed.

The Heat Exchanger Unit 21 is part of a Convective or Radiation System 2, that exhibits a Convective or Radiation Unit 22, which is located in the room or building to be air-conditioned. The heat exchanger unit consists, for instance, of a Refrigerant/Water Heat Exchanger 21 that is connected with the Convective or Radiation Unit 22, via a cold or warm-water Supply and Return Pipe 23, 24. The Refrigerant/Water Heat Exchanger 21 can consist of a tube bundle or a plate heat exchanger.

The damper system depicted in FIG. 2 in a side view of Air-conditioner 1 showing the Dampers 51 up to 54 that can be controlled independently of one another, and are located on the suction side of the Fans 8, 9, in relation to the Outside Air Connection 3 as well as to the Return Air Connection 4 in front of the upper and lower chambers of the Air-conditioner 1. By continuously changing the setting angle of the slats of the Dampers 51 up to 54, an arbitrary mixing ratio can be set both for the upper and lower chamber of the Air-conditioner 1, between the outside air and return air and the intake side of the Exhaust and Supply Airstreams 60, 70, according to FIG. 1.

In connection with the preferably continuously changeable capacity or speed of the Fans 8, 9, the composition of the exhaust and supply airstreams and their throughput depending on the required climatic conditions in the room or building to be air-conditioned, the outside temperatures and the pressure conditions in the room to be air-conditioned can be set such that, on the one hand, the conditioning tasks of the special air handling system are satisfied, and on the other hand, a high economic viability and a high safety standard are ensured.

Especially for cooling rooms in which high heat loads are incurred, an optimal mixing ratio can be set both between the return air expelled from the room or building to be air-conditioned and the outside air added and with regard to the cooling capacity of the primary air cooling, on the one hand, and the radiation and/or convective cooling on the other hand. This occurs by exploiting the so-called "free cooling," thus, both by exploiting the low outside air temperatures and by means of optimal utilization of the convective and/or radiant systems. In case of higher outside temperatures, a higher return air proportion is mixed with exhaust and/or supply airstream, so that the cooler return air is optimally utilized.

By mixing outside air in the Exhaust Airstream 60 according to FIG. 1, the condenser capacity can be optimally exploited while maintaining a high safety standard, even in the case of extraordinary temperature conditions. By increasing the speed of the Exhaust Fan 8, its capacity can be changed such that even a substantially higher volume stream of the exhaust air is set, so that the condenser is operated safely even in the case of a higher cooling capacity transported, whereby the damper system expels a large amount of return air from the room or building to be air-conditioned, by means of a corresponding setting of the Dampers 51 up to 54, and that, constant pressure conditions in the room or building to be air-conditioned are ensured and the air-based extra capacity is derived from the outside air and not from the return air and expelled to the environment via the Exhaust Air Fan 8 and the Exhaust Air Connection 6.

Figure 3:
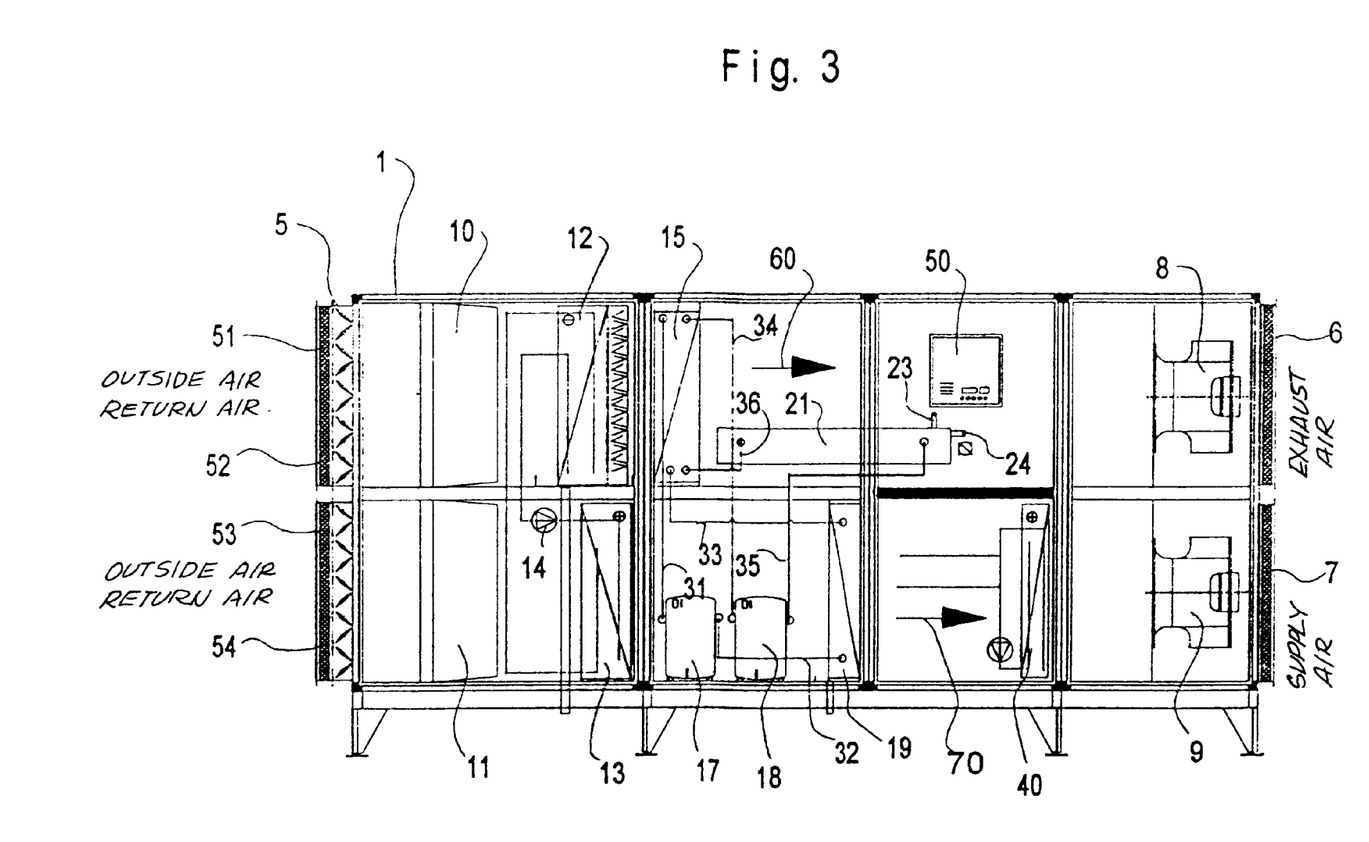
FIG. 3—A longitudinal section through an air-conditioner with a twin-circuit condenser and a heat exchanger unit.

As regards the special air handling system depicted in FIG. 1, the Refrigerant/Water Heat Exchanger 21 is located outside the Air-conditioner 1. For a more compact design, it is worthwhile to locate the Refrigerant/Water Heat Exchanger 21 also within the Air-conditioner 1, as schematically depicted in FIG. 3. This arrangement does not only offer an optimum in terms of spatial requirement of the special air handling system, but also brings the advantage of the Refrigerant/Water Heat Exchanger 21 being located in the exhaust airstream that ensures an additional heat expulsion in case of increased conveyance capacity of the Exhaust Air Fan 8 by exploiting the free cooling and thus guarantees a minimum temperature of cold water intake for the Convective and/or Radiation Unit 22. The other air treatment devices of the air-conditioner according to FIG. 3 correspond to those of the air-conditioner according to FIG. 1 and exhibit the same reference digits.

Figure 4:
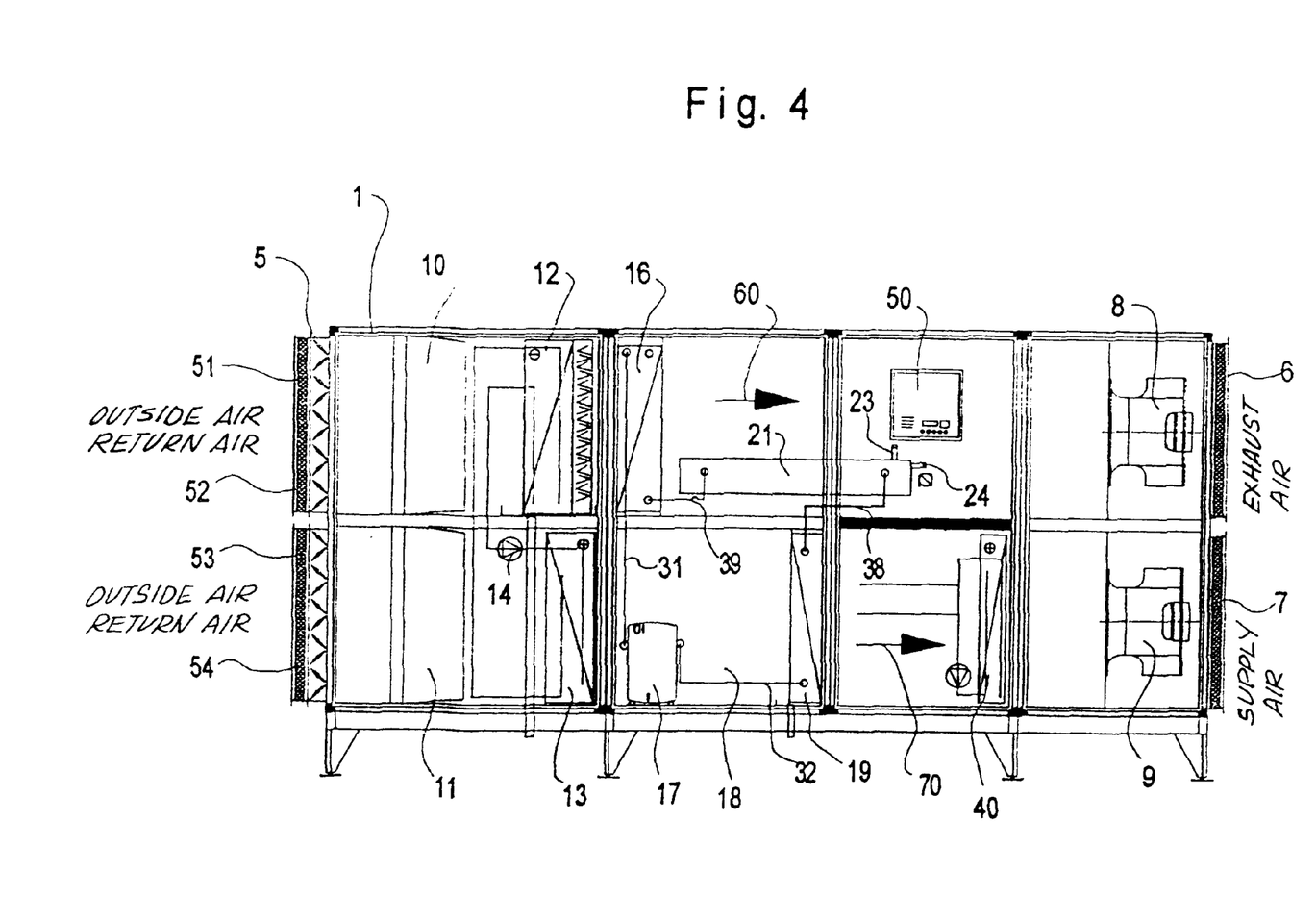
FIG. 4—A longitudinal section through an air-conditioner with a single-circuit condenser and a heat exchanger unit.

FIG. 4 shows a special air handling system with an Air-conditioner 1 that exploits the energy potential from the return air, in the same manner as the above described special air handling systems. In this version the Condenser 16 is executed as a single-circuit condenser, so that in contrast to the above-described versions the refrigeration circuits for the primary air system and the convective and/or radiant system do not act on a separate piping system within the exchanger package of the condenser, but on one and the same piping system within the exchanger package of the Condenser 16. For this purpose, the Condenser 16 is connected with the Compressor 17 via a first Refrigerant Pipe 31 and the Compressor 17 is connected with the Evaporator 19 via a second Refrigerant Pipe 32. The Evaporator 19, in contrast to the twin-circuit condenser circuits according to FIGS. 1 and 3, is not connected with the Condenser 16, but with the Refrigerant/Water Heat Exchanger 21 via an eighth Refrigerant Pipe 39. From the Refrigerant/Water Heat Exchanger 21 executed as tube bundle or plate heat exchanger, a ninth Refrigerant Pipe 39 leads back to the single-circuit Condenser 16.

Optionally, the arrangement of the Air-conditioner 1 according to FIG. 4 can also be fitted with two compressors if this should be necessary for the operation of the convective and/or radiant system.

Figure 5:
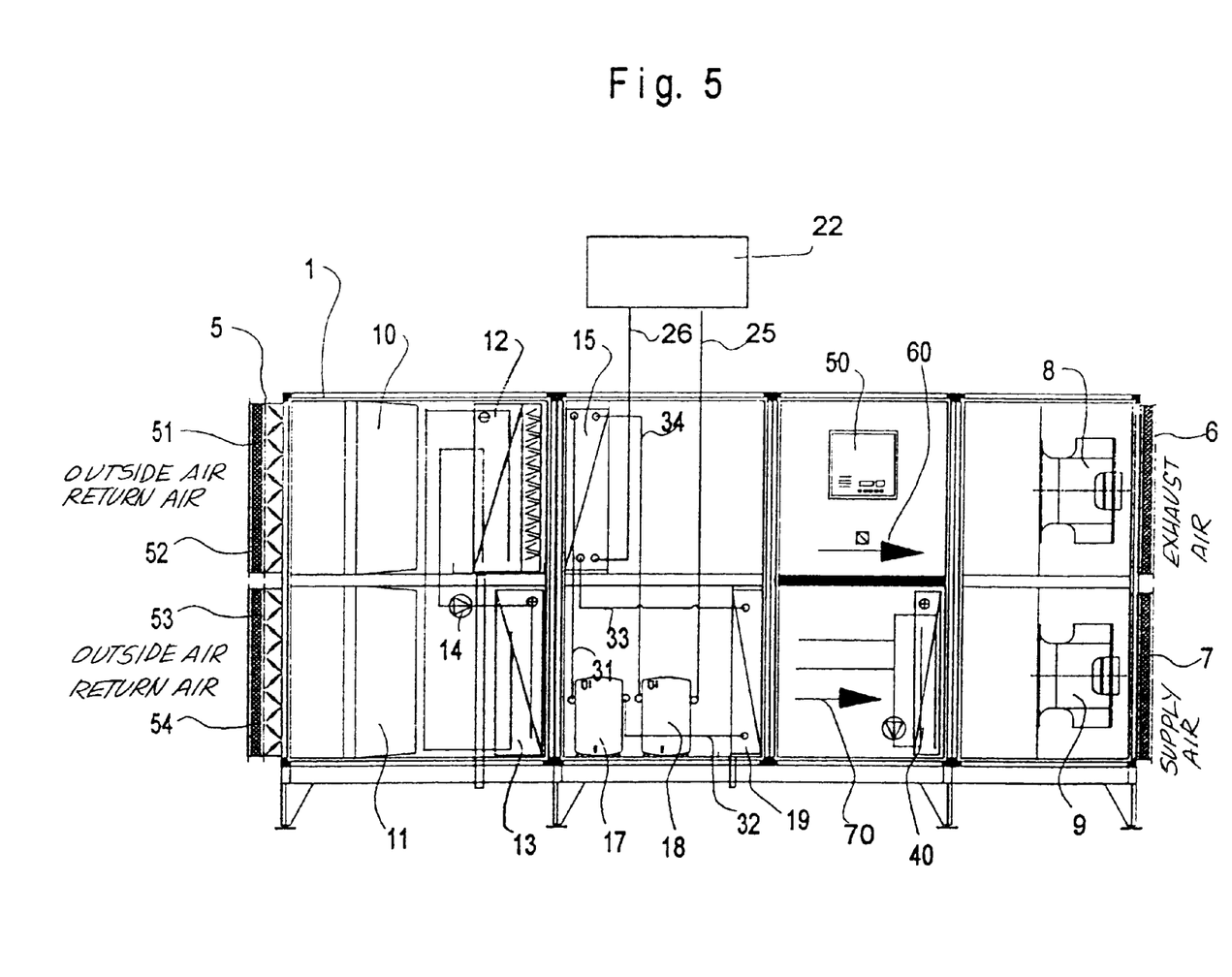
FIG. 5—A longitudinal section through an air-conditioner with a twin-circuit condenser and a direct evaporator system.

FIG. 5 schematically shows a special air handling system with the convective and/or radiant system consisting of a direct evaporation system with the Convective and/or Radiation Unit 22 being connected via a Refrigerant Intake Pipe 25 with the second Compressor 18 and via a Refrigerant Return Pipe 26 with the twin-circuit Condenser 15. The twin-circuit Condenser 15 is connected with the first Compressor 17 via a first Refrigerant Pipe 31 and connected with the Evaporator 19 via a second Refrigerant Pipe 32. The Evaporator 19 is connected with a connector of the twin-circuit Condenser 15 via a third Refrigerant Pipe 33.

Furthermore, the second Compressor 18 is connected with one circuit of the twin-circuit Condenser 15, via a fourth Refrigerant Pipe 34.

Even in this arrangement of the inventive solution, different conditioning tasks of the Air-conditioner 1 are fulfilled by combining the exhaust air and supply airstreams of the primary air system from an independently adjustable Damper System 5 with arbitrarily adjustable Dampers 51 up to 54. Through corresponding capacities of the Fans 8, 9, safe operation is also ensured in case of intensified convective and/or radiation cooling, in which, for example, the speed of the Exhaust Air Fan 8 is altered and thus its conveying capacity, so that also a greater volume flow—150%—of the nominal capacity and more is conveyed and the air-based extra capacity is derived from the outside air.

What is claimed is:

1. A special air handling system for bivalent air-conditioning of an area, comprising:
   a primary air system having an exhaust airstream directed into the environment outside of the area, and a supply airstream directed into the room, the supply airstream including return air from at least one of the area or an outside air
   at least one of a convective unit or radiation unit located inside the area to be air-conditioned;
   a heat exchanger unit through which a carrier medium flows wherein at least one of the Heat Exchanger Unit, an Evaporator System connected with the Heat Exchanger Unit via Refrigerant Pipes, or a Condenser System connected with the Heat Exchanger Unit via Refrigerant Pines is located inside the Exhaust Airstream of the Primary Air System.

2. The special air handling system according to claim 1 wherein the heat exchanger unit comprises a Water Heat Exchanger, that is connected with at least one of a Convective Unit or a Radiation Unit via a Supply Pipe and a Return Pipe.

3. The special air handling system according to claim 2 wherein the Heat Exchanger Unit is located inside the Exhaust Airstream.

4. The special air handling system according to claim 1 wherein the heat exchanger unit comprises a Water Heat Exchanger that is connected with a Compressor and a Condenser located inside the Exhaust Airstream via a plurality of Refrigerant Pipes, as well as with the at least one of the Convective Unit or Radiation Unit via a Feed Pipe and a Return Pipe.

5. The special air handling system according to claim 1, comprising a twin-circuit Condenser having a first circuit and a second circuit, the first circuit of the Condenser having a first Refrigerant Pipe that connects the Condenser with a first Compressor, and a second Refrigerant Pipe that connects the Compressor with an Evaporator located inside the Supply Airstream, a third Refrigerant Pipe that connects the Evaporator with the Condenser, the second circuit of the Condenser having a fourth Refrigerant Pipe that connects the Condenser with a second Compressor, a fifth Refrigerant Pipe that connects the second Compressor with the Heat Exchanger Unit, and a sixth Refrigerant Pipe that connects the Heat Exchanger Unit with the Condenser.

6. The special air handling system according to claim 1 wherein the Heat Exchanger Unit is located in at least one of the Exhaust Air Airstream or a Supply Airstream.

7. The special air handling system according to claim 1 wherein the Heat Exchanger Unit comprises at least one of a tube-bundle evaporator or a plate heat exchanger.

8. The special air handling system according to claim 7, comprising a Heat Reclaim System preferentially made as a circuit composite system located in the Exhaust Air Airstream and a Supply Airstream.

9. The special air handling system according to claim 8 wherein the heat reclaim system comprises at least one of a heat piping, a plate heat exchanger or a rotor.

10. The special air handling system according to claim 1 wherein the Heat Exchanger Unit comprises a direct evaporating system.

11. The special air handling system according to claim 1, comprising a Condenser and an Evaporator, wherein the Condenser and the Evaporator are executed as register units and can be switched over functionally.

12. The special air handling system according to claim 11 wherein the register located in the Return/Exhaust Airstream acts as an evaporator and feeds the energy derived from the Return/Exhaust Airstream via a refrigerant-water heat exchanger for domestic water heating.

13. The special air handling system according to claim 1, comprising:
   an Air-conditioner that exhibits at least two separated ducts for the Exhaust Airstream and the Supply Airstream, and on its intake side for airstreams it also exhibits an Outside Air Connection and a Return Air Connection for arbitrary combination of the Exhaust and Supply Airstreams, with Damper System, of the outside air and return air independently controllable, an Exhaust Air Fan and a Supply Air Fan with the Damper System being located on the suction side of the Fans.

14. The special air handling system according to claim 1 wherein the Evaporator or Condenser System or the Heat Exchanger Unit is located between the Exhaust Air or Supply Air Fan and the Damper System on the suction side of the Fans.

15. The special air handling system according to claim 1, comprising a heater for air heating located in the Supply Airstream.

16. The special air handling system according to claim 15 wherein the heater comprises a warm water heater.

17. The special air handling system according to claim 1, comprising an Exhaust Air Fan and a Supply Air Fan wherein the air transport capacity of the Exhaust and Supply Air Fans is continuously variable.

18. The special air handling system according to claim 16 wherein the air transport capacity of the Exhaust Air Fan being variable such that an increased exhaust-air volume flow is transportable, with a Damper System set in a way that the nominal value of the return air is maintained and an extra flow capacity is derived from the outside air.

19. The special air handling system according to claim 1 comprising an airstream system and at least one of a convective system or radiant system, the portion of the airstream system and the at least one of the convective system or radiant system for the air-conditioning can be set.

20. The special air handling system according to claim 1, comprising at least one Air Treatment Component each of the Air Treatment Components capable of being activated separately from one another.

21. The special air handling system according to claim 1 wherein the primary air system is designed on a modular basis, the module having a Damper System, at least one Air Treatment Component, a Control and Switching Device and a plurality of Fans.

22. The special air handling system according to claim 20 wherein the primary air system comprises a combination of separately installed modules.

23. The special air handling system according to claim 1 wherein the air-conditioner includes a plurality of Flow Ducts for the Exhaust Air Airstream and the Supply Airstream located over one another.

24. The special air handling system according to claim 22 wherein the Flow Ducts are located over one another and the Supply Airstream Duct is located beneath the Exhaust Airstream Duct.

25. The special air handling system according to claim 1 wherein the air-conditioner includes Flow Ducts for the Exhaust Air Airstream and the Supply Airstream located besides one another.

* * * * *